(12) United States Patent
Higginson

(10) Patent No.: US 6,651,997 B2
(45) Date of Patent: Nov. 25, 2003

(54) TRAILER BUNK COVER ASSEMBLY

(76) Inventor: Robert H. Higginson, 4515 -A O'Hara Dr., Evansville, Vanderburgh County, IN (US) 62242

(*) Notice: Subject to any disclaimer, the term of this patent is extended or adjusted under 35 U.S.C. 154(b) by 0 days.

(21) Appl. No.: 10/215,628

(22) Filed: Aug. 9, 2002

(65) Prior Publication Data

US 2003/0042704 A1 Mar. 6, 2003

Related U.S. Application Data

(60) Provisional application No. 60/315,928, filed on Aug. 29, 2001.

(51) Int. Cl.$^7$ ................................................ B60P 3/10
(52) U.S. Cl. ...................................... 280/414.1; 384/42
(58) Field of Search ....................... 280/414.1; 224/325, 224/326; 384/42

(56) References Cited

U.S. PATENT DOCUMENTS

| | | | | |
|---|---|---|---|---|
| 3,406,985 A | * | 10/1968 | Ballenger et al. | ............ 280/646 |
| 4,440,095 A | * | 4/1984 | Mathieu | ...................... 105/225 |
| 5,002,299 A | * | 3/1991 | Firehammer et al. | .... 280/414.1 |
| 5,133,570 A | * | 7/1992 | Godbersen | ............... 280/414.1 |
| 5,195,767 A | * | 3/1993 | Des Roches | ............. 280/414.1 |
| 6,189,909 B1 | * | 2/2001 | Danchuk | ................. 280/414.1 |

* cited by examiner

Primary Examiner—Kevin Hurley
(74) Attorney, Agent, or Firm—Gary K. Price, Esq.

(57) ABSTRACT

A trailer bunk cover assembly designed to not only protect boat hulls during launching and loading from the trailer, but also to protect the trailer's bunks from becoming worn down with use. The bunk cover assembly includes a main body portion having an upper surface and a lower surface. When mounted to the trailer bunk, the lower surface of the main body portion is in contact with the top surface of the trailer bunk. When a boat is loaded on the boat trailer, the hull of the boat rests on the upper surface of the main body portion. The cover assembly further includes first and second side panels that extend downward from the main body portion. The side panels cooperate to help position the main body portion against the top surface of the trailer bunk. The side panels respectively include a plurality of apertures. Attachment screws that act as a securing means to hold the cover assembly in place on the top surface of the trailer bunk. The upper surface of the main body includes an upper recessed portion, and the lower surface of the main body portion includes a lower recessed portion. Said upper recessed portion disposed in the approximate midway of the upper surface and extends the longitudinal axis of the upper surface. Said lower recessed portion disposed in the approximate midway of the lower surface and extends the longitudinal axis of the lower surface. The upper recessed portion in parallel relationship with the lower recessed portion.

3 Claims, 3 Drawing Sheets

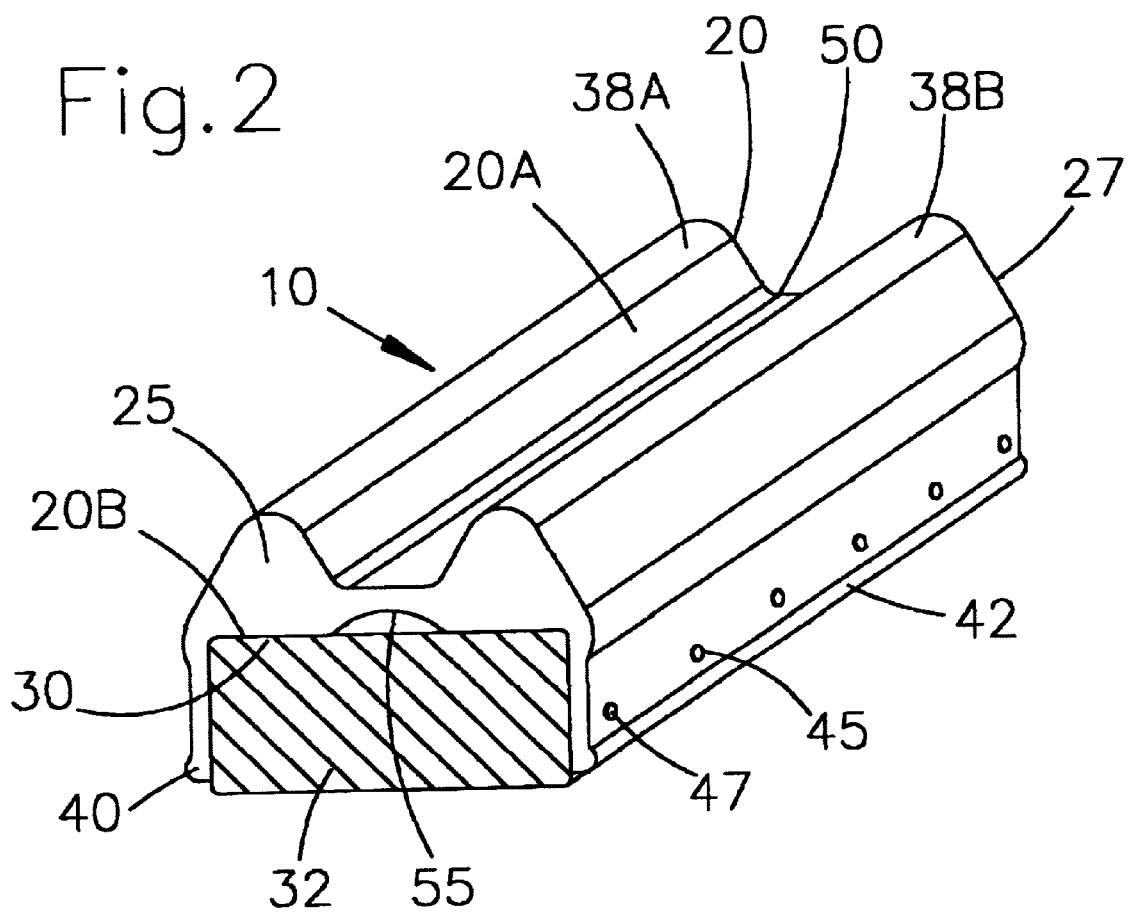

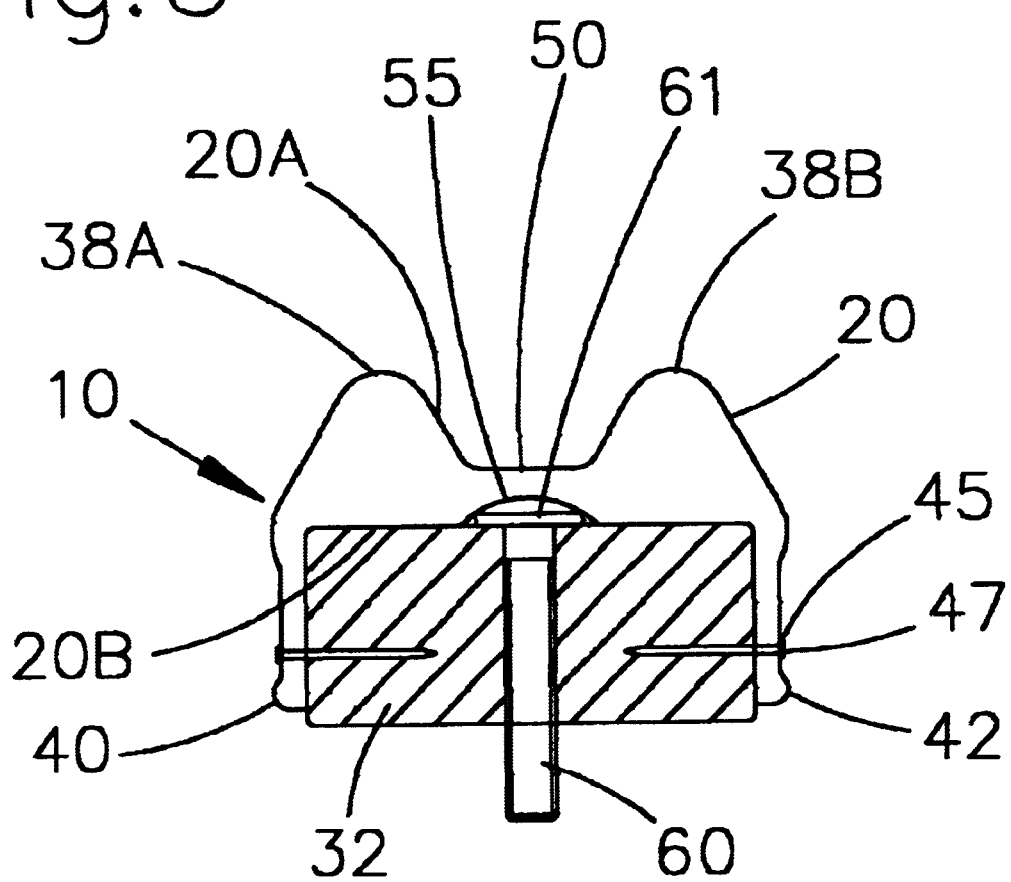

TRAILER BUNK COVER ASSEMBLY

CROSS REFERENCES TO RELATED APPLICATIONS

U.S. Provisional Application for Patent No. 60/315,928, filed Aug. 29, 2001, with title "Vehicle Transporting Trailer Assembly" which is hereby incorporated by reference. Applicant claims priority pursuant to 35 U.S.C. Par. 119(e)(i).

Statement as to rights to inventions made under Federally sponsored research and development: Not Applicable

BACKGROUND OF THE INVENTION

1. Field of the Invention

A bunk cover assembly for mounting on the bunks of a boat trailer includes a pair of side panels which depends from a main body of the cover assembly, said side panels for abutment and attachment to the sides of the bunks. The bunk cover assembly includes an upper recessed portion to facilitate drainage and boat hull passage over the cover assembly, and a lower recessed portion that serves as a channel for draining water collected from the trailer bunks when launching or loading the boat, and further allows air to reach the bunks for faster drying thereby resisting moisture and mildew damage to the bunks.

2. Brief Description of Prior Art

The present invention concerns primarily trailers for boats which are loaded and unloaded from the rear end of the trailer. These trailers often include lengthwise extending bunks on which a boat is slid into place for travel and conversely, slid into the water during a launching operation. Further, when loaded on the trailer, the hull of the boat rests on these bunks.

The loading and launching of a boat from a trailer subjects the trailer bunks to considerable wear. Boat trailer bunks have traditionally been formed of wood or metal. In order to protect the boat from being marred by the trailer bunk during the loading or unloading operation, specifically when the boat hull is being slid over the bunks, the operator often covers the bunks with carpet or carpet-like material. It is believed that the loading and launching of a boat from trailer bunks clad with carpet material is less likely to scratch or cause damage to the boat hull than wood or metal bunks without carpet material.

A problem occurs with the traditional wood bunks since wood is generally not an ideal material under marine conditions. When exposed to moisture, wood has a tendency to warp or rot, thereby decreasing the structural integrity of the bunks. This problem is compounded for bunks clad with carpet material. Bunk-covering carpet tends to deteriorate quickly with continued use. The carpet material when exposed to moisture, and in this case when submerged in water, traps the moisture thereby exposing the wood bunks to an extended period of moisture exposure. Further, the carpet material, as a result of moisture, will dry rot through mildew. And although bunks with deteriorated coverings may still support the boat, worn spots increase sliding friction and can permanently damage boat hulls. As a result, the carpet material is replaced frequently, and the wood bunks are replaced more often.

Likewise, metal is generally not an ideal material under marine conditions. Metal bunks will corrode and rust, thereby causing an increase in sliding friction between the hull of the boat and the bunks during launching or loading. Such friction further causing permanent damage to the hull of the boat.

A further problem occurs with traditional bunks when the boat is loaded on the trailer. When loaded on the trailer, the hull of the boat rests on these bunks. As a result, air is prevented from adequately reaching the portion of the bunks where the boat hull is resting. The bunks are therefore unable to adequately dry, causing the wood bunks to remain moist, and further causing the bunks to warp and rot, thereby decreasing the structural integrity of the bunks. Further, when the boat is resting on the trailer, the bunks are unprotected from the elements including problems with moisture as discussed above, and concerns relating to sun damage.

A further problem encountered with traditional bunks is the task of aligning the center line of the boat with that of the trailer during retrieving or loading of the boat. Lateral displacement of the boat hull during such alignment is often difficult by reason of the hull being in contact with the traditional flat bunks which fail to facilitate loading of a boat hull.

U.S. Pat. No. 4,519,738 discloses a boat trailer having a tiltable bunk provided with rollers at each end of the bunk to facilitate loading and launching of a boat from a trailer.

U.S. Pat. No. 5,993,063 discloses a skid plate installed on the rearwardmost end of a trailer bunk to resist displacement by contact of a boat hull; and further includes radiused corners to avoid marring of the boat hull particularly during that time when the hull is being aligned with the trailer during loading.

U.S. Pat. No. 6,189,909 discloses a skid protection assembly that is a protective shell sized and shaped to fit an end of a trailer skid member, said assembly having a sloped wall portion extending outwardly from a main contact panel for spacing the end of the skid from a closed end wall of the assembly.

Thus, what is needed is a low-friction, trailer bunk cover assembly that protects and cooperates with existing bunks of a trailer to allow a boat to be loaded and unloaded easily, while addressing the shortcomings of the prior art trailer bunks. The cover assembly should not only protect boat hulls, but also should protect the trailer's bunks from becoming worn down with use. The cover assembly should allow the bunks to dry quickly and should be attached in a manner that allows the cover assembly to be easily removed, if necessary. The cover assembly should also be non-corrosive and suitable for use in a marine environment.

SUMMARY OF THE INVENTION

The present invention is a trailer bunk cover assembly for protection of the trailer's bunks. The present invention is designed to not only protect boat hulls during launching and loading from the trailer, but also to protect the trailer's bunks from becoming worn down with use. The preferred embodiment includes a main body portion having an upper surface and a lower surface. When mounted to the trailer bunk, the lower surface of the main body portion is in contact with the top surface of the trailer bunk. When a boat is loaded on the boat trailer, the hull of the boat rests on the upper surface of the main body portion. The cover assembly further includes first and second side panels that extend downward from the main body portion. The side panels cooperate to help position the main body portion against the top surface of the trailer bunk. The side panels respectively include a plurality of apertures, and attachment screws that act as a securing means to hold the cover assembly in place on the top surface of the trailer bunk. The upper surface of the main body includes an upper recessed portion, and the lower surface of the main body portion includes a lower recessed portion. Said upper recessed portion disposed in the approximate midway of the upper surface and extends the longitudinal axis of the upper surface. Said lower recessed portion disposed in the approximate midway of the lower surface and extends the longitudinal axis of the lower surface. The upper recessed portion in parallel relationship with the lower recessed portion.

BRIEF DESCRIPTION OF THE DRAWINGS

A preferred embodiment of the invention, illustrative of the best mode in which applicant has contemplated applying the principles of the invention, is set forth in the following description and drawings and will be particularly and distinctly pointed out and set forth in the claims of the formal application.

FIG. 2 is a perspective view of the cover assembly of FIG. 1 mounted to a trailer bunk.

FIG. 3 is an end view of the cover assembly of FIG. 2.

DESCRIPTION OF THE PREFERRED EMBODIMENT

Figure 1:
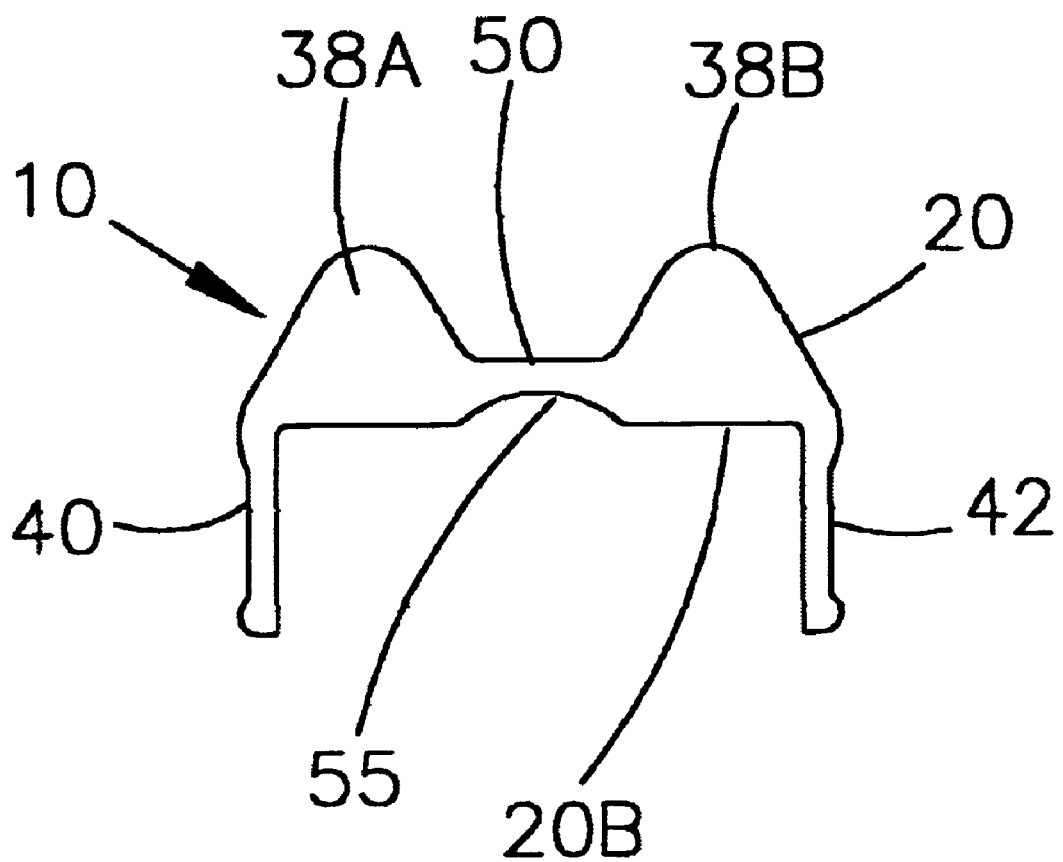
FIG. 1 is an end view of a preferred embodiment of the present invention, a trailer bunk cover assembly.

FIGS. 1–3 illustrate a preferred embodiment of a trailer bunk cover assembly 10 made in accordance with the present invention. By way of overview, the cover assembly 10 is shaped to cover a top surface 30 of a trailer bunk 32 employed on a conventional boat trailer (not shown). The cover assembly 10 includes a main body portion 20 having an upper surface 20A and a lower surface 20B. When mounted to the bunk 32, the lower surface 20B of the main body portion 20 is in contact with the top surface 30 of the trailer bunk 32. When a boat (not shown) is loaded on the boat trailer, the hull of the boat rests on the upper surface 20A of the main body portion 20. The cover assembly 10 further includes a first side panel 40 and a second side panel 42. The side panels 40, 42 extend downward from the main body portion 20. As shown in FIG. 2, said side panels 40, 42 extend respectively the length of the main body portion 20, from a first end 25 of the main body portion 20 to a second end 27. The side panels 40, 42 cooperate to help position the main body portion 20 against the top surface 30 of the trailer bunk.

As shown in FIGS. 2–3, the side panels 40, 42 respectively include a plurality of apertures 45, and attachment screws 47 that act as a securing means to hold the cover assembly 10 in place on the top surface 30 of the trailer bunk 32. As shown in FIG. 3, the screws 47 passthrough the apertures 45 of the side panels 40, 42, and extend into the trailer bunk 32. Use of screws 47 allows for removal of an attached cover assembly 10 to be removed as needed. Although the preferred securing means employs attachment screws 47 as discussed above, the screws may be supplemented by, or replaced with, other relatively permanent fasteners including, but not limited to, rivets, nails, or staples.

As shown in the drawings, the upper surface 20A of the main body 20 includes an upper recessed portion 50, and the lower surface 20B of the main body portion 20 includes a lower recessed portion 55. Said upper recessed portion 50 disposed in the approximate midway of the upper surface 20A and extends the longitudinal axis of the upper surface 20A. Said lower recessed portion 55 disposed in the approximate midway of the lower surface 20B and extends the longitudinal axis of the lower surface 20B. The upper recessed portion 50 in parallel relationship with the lower recessed portion 55.

The lower recessed portion 55 of the lower surface 20B serves primarily three purposes. First, the lower recessed portion 55 serves as a channel for providing improved drainage of water collected from the trailer bunks 32 when launching or loading the boat. Second, whether or not the boat is resting on the trailer bunks 32, the lower recessed portion 55 promotes quicker drying of the bunks 32 since air flow is able to adequately reach the bunks 32 through the lower recessed portion 55. As a result, the bunks 32 are able to dry quicker, thereby reducing the time the bunks 32 remain wet following launching or loading the boat. As such the bunks 32 resist the tendency of warping and rotting, and therefore better maintain their structural integrity. Third, as shown in FIG. 3, the bunks 32 are often attached to the trailer using a carriage bolt 60, with a head 61 of the bolt 60 exposed on the top surface 30 of the trailer bunk 32. The second recessed portion 55 serves as a clearance for the head 61 of the bolt 60.

The upper recessed portion 50 of the upper surface 20A is disposed in the approximate midway of the upper surface 20A defining a first guide 38A and a second guide 38B. The upper recessed portion 50 serves as a channel for providing improved drainage of water collected between the hull of the boat and the main body portion 20 when launching or loading the boat. The first and second guides 38A, 38B facilitate the task of aligning the boat with the trailer during retrieving or loading of the boat. Said guides 38A, 38B serve to guide the boat hull into alignment during loading of the boat hull. Lateral displacement of the boat hull during such alignment is reduced by reason of the hull being in contact with the guides 38A, 38B which facilitate loading of the boat hull.

The cover assembly 10, and most significantly the upper surface 20A of the main body 20 has a low coefficient of friction. The preferred material for the cover assembly 10 is a soft vinyl non-marking material, although other low-friction mjaterials may suffice.

It is understood that while a certain form of the invention is illustrated, it is not to be limited to the specific form or arrangement of parts herein described and shown. It should be apparent to those skilled in the art that various changes may be made without departing from the scope of the invention and the invention is not to be considered limited to what is shown in the drawings and described in the specification. For example, while the specification describes the present invention mounted to trailer bunks, it should be understood that the cover assembly 10 may be attached to other marine fixtures, such as mounting to boat lifts, side cradle bunkboards, dry storage rests, dock edges, and dock posts, without departing from the scope of the invention. As such, although the description above contains many specificities, these should not be construed as limiting the scope of the invention but as merely providing illustrations of some of the presently preferred embodiments of this invention.

Thus the scope of the invention should be determined by the appended claims in the formal application and their legal equivalents, rather than by the examples given.

I claim:

1. A cover assembly for mounting to a fixture, said cover assembly comprising:

an elongated main body portion having an upper surface and a lower surface;

a first side panel and a second side panel, said first and second side panels extend downward from the main body portion and include a plurality of apertures;

securing means for attaching the cover assembly to the fixture;

wherein the upper surface of the main body includes an upper recessed portion disposed in the approximate midway of the upper surface and extends the longitudinal axis of the upper surface;

wherein the lower surface of the main body includes a lower recessed portion disposed in the approximate midway of the lower surface and extends the longitudinal axis of the lower surface;

wherein the cover assembly is made of a soft vinyl non-marking material.

2. A trailer bunk cover assembly for mounting to a trailer bunk, said trailer bunk cover assembly comprising:

an elongated main body portion having an upper surface and a lower surface;

a first side panel and a second side panel, said first and second side panels extend downward from the main body portion and include a plurality of apertures;

attachment screws that passthrough the apertures and extend into the trailer bunk;

wherein the upper surface of the main body includes an upper recessed portion defining a first guide and a second guide, said upper recessed portion disposed in the approximate midway of the upper surface and extends the longitudinal axis of the upper surface;

wherein the lower surface of the main body includes a lower recessed portion disposed in the approximate midway of the lower surface and extends the longitudinal axis of the lower surface;

wherein the cover assembly is made of a soft vinyl non-marking material.

3. A cover assembly for mounting to a fixture, said cover assembly comprising an elongated main body portion, a first side panel and a second side panel, said first and second side panels extend downward from the main body portion, a securing means for attaching the cover assembly to the fixture, an upper recessed portion and a lower recessed portion;

wherein the cover assembly is made of a soft vinyl non-marking material.

* * * * *